No. 646,422. Patented Apr. 3, 1900.
C. R. FISK.
OIL WELL TOOL.
(Application filed June 14, 1897. Renewed Dec. 2, 1899.)
(No Model.)
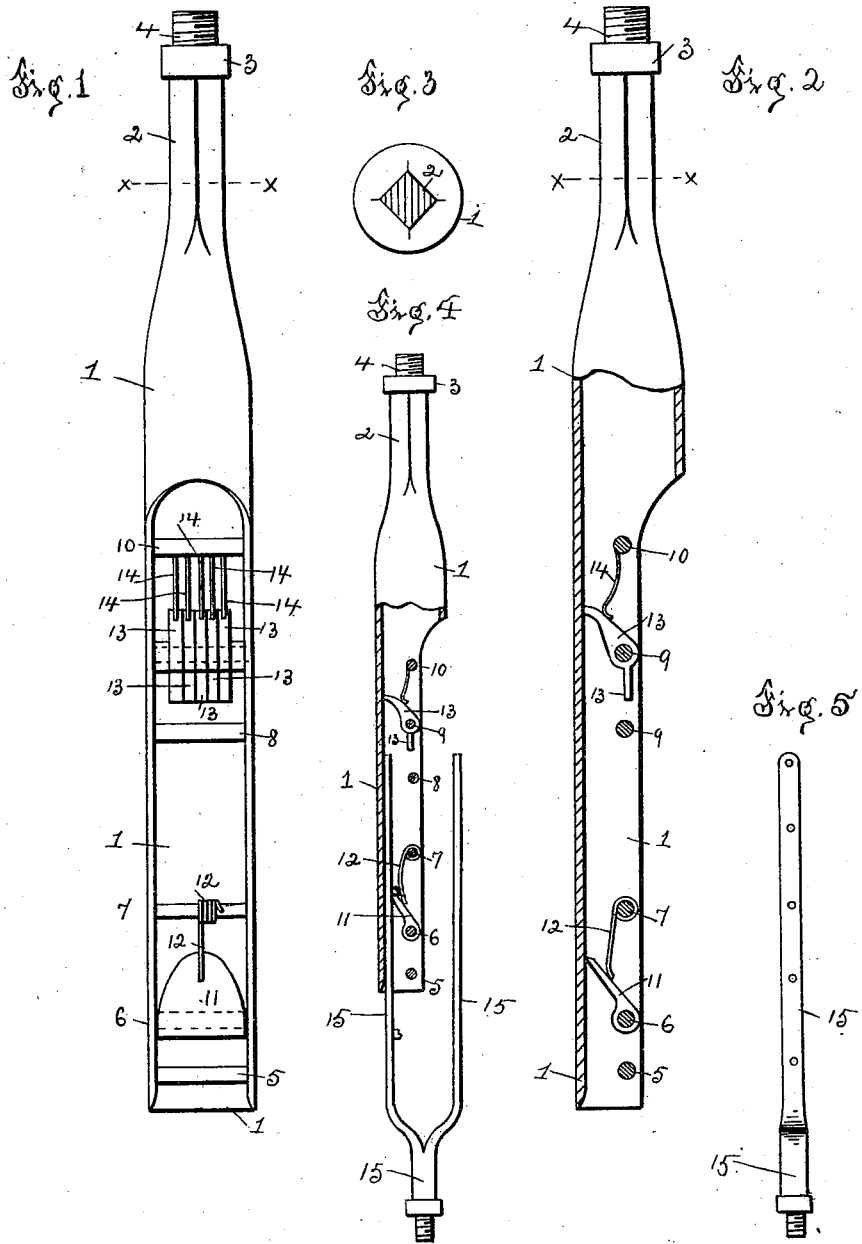

UNITED STATES PATENT OFFICE.

CHARLES R. FISK, OF CECIL, PENNSYLVANIA.

OIL-WELL TOOL.

SPECIFICATION forming part of Letters Patent No. 646,422, dated April 3, 1900.

Application filed June 14, 1897. Renewed December 2, 1899. Serial No. 739,018. (No model.)

*To all whom it may concern:*

Be it known that I, CHARLES R. FISK, a citizen of the United States, residing at Cecil, in the county of Washington and State of Pennsylvania, have invented certain new and useful Improvements in Oil or other Well Tools; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in oil or other well tools.

The invention has for its object the provision of a tool for removing sucker-rods after they have become detached.

In the pumping of oil or other wells it sometimes happens that the sucker-rods become broken and either pull out the rivets by which they are attached to the straps or partly break off the rivets, and in such instances where the rods become detached from the straps it is a difficult operation to catch the rods and remove them from the well; but with my improved tool the rods may be readily removed.

With the above object in view the invention finally consists in the novel construction, combination, and arrangements of parts, as will be hereinafter more specifically described in detail.

In describing the invention in detail reference is had to the accompanying drawings, forming a part of this specification, and wherein like numerals designate like parts at the several views shown, in which—

Figure 1 is a vertical front view of the improved tool. Fig. 2 is a vertical side view of the same, which is partly shown in section. Fig. 3 is an end sectional view, looking down upon the tool, on the line X X of Figs. 1 and 2. Fig. 4 is a side view of the same device, partly shown in section, reduced to a smaller scale and showing a detached strap in connection with the same. Fig. 5 is a vertical side view of a sucker-rod strap.

In the drawings the numeral 1 designates a tubular socket which is open at one side and has the square portion 2, the shouldered portion 3, and threaded extension 4 formed at its upper portion. Attached to the said socket and extending across at right angles to the same are the pins 5, 6, 7, 8, 9, and 10. Pivoted upon the pin 6 is the dog or pawl 11, which extends inwardly at an angle against the inner wall of the socket and is held in tension by means of the spring 12, which is attached to the pin 7. Pivoted upon the pin 9 is the series of dogs or pawls 13, each of which is independent of one another and is placed in tension by a series of independent springs 14, which is attached to the pin 10.

Assuming that a sucker-rod strap becomes detached from the wood, such as shown and designated as 15, has become detached from the rods, and is located within the well, the operation of removing the socket would be as follows: The device is attached to the rope and lowered into the well, and when the end of the tool or device comes in contact with one of the socket-wings the said wing enters the tool beneath the spring-actuated dog or pawl 11, and if there is a broken rivet remaining in the socket the upward pull of the tool will cause the said dog to catch beneath the rivets, as shown at Fig. 4, thus holding the socket until removed from the well, where it may be readily detached from the tool by releasing the said dog. Again, should there be no rivets remaining in the wings of the socket—that is, should the rivets be pulled out from the holes in the socket—the tool is lowered farther until the point of any one of the spring-actuated dogs 13 will engage with the rivet-hole in the socket. The socket is then removed from the well.

The object of having a number of the dogs 13 is that should the socket-wing enter slightly to one side any one of the said dogs which should happen to come in line with the hole will be sure to act. One dog would be sufficient in most cases; but I prefer to use a number of them, as shown and described. Also slight variations may be made in the detail parts without departing from the general spirit of the invention.

Having thus fully shown and described my invention, what I claim as new, and desire to secure by Letters Patent, is—

1. A tool for removing sucker-rod straps from oil-wells consisting of the hollow tubular sockets having extending therethrough an upper and a lower series of pins, a spring-actuated pawl mounted upon one of the lower pins adapted to engage with the rivets of the sucker-rod, and a series of spring-actuated pawls independently mounted upon one of the said upper pins, adapted to engage with the rivet-holes of the sucker-rod, substantially as described.

2. A tool for removing sucker-rod straps from oil-wells consisting of the hollow tubular socket provided interiorly with a series of upper and lower pins extending laterally therethrough, a pawl mounted upon the center pin of the said lower series of pins, a spring mounted upon the pin above the pawl, the free end of which is adapted to bear against the said pawl, a series of pawls independently mounted upon the center pin of the said upper series of pins, and a series of springs mounted upon the pins above the pawls, the free ends of which are adapted to bear against the said pawls, substantially as described.

In testimony whereof I affix my signature in presence of two witnesses.

CHARLES R. FISK.

Witnesses:
 JOHN GROETZINGER,
 H. J. LEVIS.